US006789618B2

(12) United States Patent
Pearson

(10) Patent No.: US 6,789,618 B2
(45) Date of Patent: Sep. 14, 2004

(54) ENERGY RECYCLING AIR HANDLING SYSTEM

(76) Inventor: Frederick J. Pearson, 312 W. Moore St., Southport, NC (US) 28461

( * ) Notice: Subject to any disclaimer, the term of this patent is extended or adjusted under 35 U.S.C. 154(b) by 367 days.

(21) Appl. No.: 09/945,788

(22) Filed: Sep. 5, 2001

(65) Prior Publication Data

US 2003/0042012 A1 Mar. 6, 2003

(51) Int. Cl.$^7$ .......................... F24F 11/04; F24F 13/14; F24F 7/08; F24F 7/007; F24F 3/14

(52) U.S. Cl. .................. 165/210; 165/215; 165/217; 165/54; 165/104.14; 165/103; 236/49.3; 236/1 B

(58) Field of Search ................... 165/210, 215, 165/217, 54, 103, 104.14; 236/49.3, 1 B

(56) References Cited

U.S. PATENT DOCUMENTS

| | | | |
|---|---|---|---|
| 3,788,388 A | * | 1/1974 | Barkmann .................... 165/54 |
| 3,861,459 A | | 1/1975 | Koop |
| 3,889,742 A | | 6/1975 | Rush et al. |
| 4,014,380 A | | 3/1977 | Rush et al. |
| 4,093,435 A | | 6/1978 | Marron et al. |
| 4,100,763 A | | 7/1978 | Brody |
| 4,113,004 A | | 9/1978 | Rush et al. |
| 4,162,703 A | | 7/1979 | Bosaeus |
| 4,180,126 A | | 12/1979 | Rush et al. |
| 4,180,985 A | | 1/1980 | Northrup, Jr. |
| 4,299,272 A | * | 11/1981 | Del Bagno, Sr. ............. 165/54 |
| 4,314,607 A | | 2/1982 | DesChamps |
| 4,594,860 A | | 6/1986 | Coellner et al. |
| 4,769,053 A | | 9/1988 | Fischer, Jr. |
| 4,854,376 A | | 8/1989 | Tunekawa et al. |
| 4,952,283 A | | 8/1990 | Besik |
| 4,955,285 A | * | 9/1990 | Geilinger et al. ............. 165/54 |
| 4,971,139 A | | 11/1990 | Khattar |
| 5,024,263 A | * | 6/1991 | Laine et al. ................... 165/54 |
| 5,036,907 A | | 8/1991 | Leven |
| 5,069,272 A | | 12/1991 | Chagnot |
| 5,183,098 A | | 2/1993 | Chagnot |
| 5,279,609 A | | 1/1994 | Meckler |
| 5,285,842 A | | 2/1994 | Chagnot |
| 5,301,744 A | | 4/1994 | Derks |
| 5,325,676 A | | 7/1994 | Meckler |
| 5,485,878 A | | 1/1996 | Derks |

(List continued on next page.)

FOREIGN PATENT DOCUMENTS

| | | | | |
|---|---|---|---|---|
| DE | 3030778 | * | 2/1982 | .................... 165/54 |
| DE | 3644807 | * | 7/1988 | .................... 165/54 |
| EP | 0029573 | * | 6/1981 | .................... 165/54 |
| EP | 0184887 | * | 6/1986 | .................... 165/54 |
| FR | 2626969 | * | 8/1989 | ................... 165/103 |
| JP | 57-55338 | * | 4/1982 | .................... 165/54 |
| JP | 60-259849 | * | 12/1985 | .................... 165/54 |
| JP | 1-147240 | * | 6/1989 | .................... 165/54 |
| JP | 1-300131 | * | 12/1989 | |
| JP | 6-265188 | * | 9/1994 | .................... 165/54 |
| WO | WO 89/02566 | * | 3/1989 | .................... 165/54 |

Primary Examiner—John K. Ford
(74) Attorney, Agent, or Firm—Harold Gell, P.C.

(57) ABSTRACT

An air handling system including at least one terminal unit for maintaining a serviced volume at a predetermined temperature below the temperature of the air supplied by the central source of the air handling system is provided through the use of a refrigerant means in the form of a passive thermal energy recovery device which provides heat transfer between the outgoing and inflowing air streams provided by the a central air handling system. The heat transfer between air streams is regulated as a function of air velocity and temperature differentials as measured at various points in system which are related specifically to the serviced volume. Environmental control within the serviced volume is exercised by controlling face and bypass dampers to regulate the air flow through the passive heat exchanger and the air exchange rate is controlled by modulating the operation of the dampers or by regulating the air flow into or out of the serviced volume by way of supply and/or exhaust louvers.

11 Claims, 4 Drawing Sheets

U.S. PATENT DOCUMENTS

| | | |
|---|---|---|
| 5,542,968 A | 8/1996 | Belding et al. |
| 5,548,970 A | 8/1996 | Cunningham, Jr. |
| 5,651,258 A | 7/1997 | Harris |
| 5,667,643 A | 9/1997 | Satchell, Jr. |
| 5,732,562 A | 3/1998 | Moratalla |
| 5,761,915 A | 6/1998 | Rao |
| 5,782,104 A | 7/1998 | Sami et al. |
| 5,887,784 A | 3/1999 | Haas |
| 5,946,190 A | 8/1999 | Patel et al. |
| 6,185,943 B1 | 2/2001 | Kopko |
| 6,196,469 B1 | 3/2001 | Pearson |
| 6,199,388 B1 | 3/2001 | Fischer, Jr. |

* cited by examiner

ENERGY RECYCLING AIR HANDLING SYSTEM

BACKGROUND OF THE INVENTION

1. Field of the Invention

This invention relates to the use of passive thermal energy recovery means to recycle thermal energy in air handling systems and more particularly to systems including a heat pipe or fixed plate heat recovery system in which the heat recovery means is selectively employed when heat is transferred, to or from return/exhaust air and/or inlet air, as desired to meet constant or variable volume requirements coincident with constant temperature requirements.

2. Discussion of the Related Art

Heat pipes and fixed plate heat exchanges for transferring thermal energy are old and well known as independent or secondary thermal energy transfer systems. For instance, an example of a typical heat pipe augmentation of an air-conditioning system is found in U.S. Pat. No. 4,971,139 for "Heat Tube Device" wherein heat pipes are used to couple a cooling coil to the air flow in a typical single volume single temperature central air-conditioning system.

Such systems are not practical in hospitals where the problem is more complex because individual rooms have individual air handling requirements specifying constant or variable volume and constant temperature. Historically this individual room requirement problem has been solved by combining hot water, steam or electrical reheaters and controllable vents to modify conditioned air provided by a central system. Constant-volume reheat units have been in use to modify conditioned air for selected rooms for approximately 40 years and variable-volume reheat units have been known for 25 years. The systems have met the needs of industry but at a prohibitive cost in wasted energy. Such systems expend large amounts of energy to cool the air and then spend additional energy to heat the conditioned air for selected rooms.

One solution is provided by U.S. Pat. No. 6,196,469 for "Energy Recycling Air Handling System" issued to the inventor of the improvements described and claimed herein. That system uses an energy wheel to reclaim thermal energy but its total energy efficiency is degraded because of the electrical energy required to drive the wheel. In addition, the system has not gained wide spread acceptance because the cost of producing efficient thermal energy wheels is prohibitive.

OBJECTIVES OF THE INVENTION

A primary objective of the present invention is to provide a thermal energy transfer means to replace or reduce the use of reheaters in constant-volume and variable-volume terminal units of an air handling system.

Another primary objective of the present invention is to provide a thermal energy transfer means which requires little or no energy expenditure to replace energy wheels in constant-volume and variable-volume terminal units of an air handling system.

Another objective is to provide a heat pipe heat recovery system which remains in the flow stream of the inlet and exhaust air and the heat recovery system is selectively operated by varying the amount of air flowing across the coil by modulating face and bypass dampers.

Another objective is to provide a heat pipe heat recovery system which remains in the flow stream of the inlet and exhaust air and the heat recovery system is selectively operated by varying the amount of tilt of the heat pipe assembly in the constant-volume and variable-volume terminal units of an air handling system.

Another objective is to provide a fixed plate heat exchanger heat recovery system which remains in the flow stream of the inlet and exhaust air and the heat recovery system is slectively operated by varying the amount of air flowing across the coil by modulating face and bypass dampers.

Another object is to provide a heat recovery system employing a heat pipe refrigerant section in which the amount of air flowing across the section is varied through the modulation of face and bypass dampers as dictated by the thermal requirements of a room serviced by a terminal unit of an air handling system.

Another object is to provide a heat recovery system employing a heat pipe refrigerant section in which the heat pipe assembly is tilted as dictated by the thermal requirements of a room serviced by a terminal unit of an air handling system.

Another object is to provide a heat recovery system employing a fixed plate heat exchanger in which the amount of air flowing across the plate is varied through the modulation of face and bypass dampers as dictated by the thermal requirements of a room serviced by a terminal unit of an air handling system.

Other objects, features and advantages of this invention will be apparent from the drawings, specification and claims which follow.

SUMMARY OF THE INVENTION

To overcome the energy extravagance of energy wheels or reheaters commonly employed in air handling systems serving a plurality of individual rooms having different temperature requirements with constant or variable volume specifications, the present invention provides a heat pipe refrigerant section or fixed plate heat exchanger arranged as a cross-flow heat exchanger with face and bypass dampers to transfer thermal energy between the inlet and outlet air flows of a terminal unit and thereby control the temperature while maintaining constant or variable volume protocols. In an alternate embodiment, the tilt of the heat pipe assembly is controllable to further enhance the adaptability of the system.

BRIEF DESCRIPTION OF THE DRAWINGS

FIG. 2 is a perspective view of an individual room air handling unit cut away to show the employment of a fixed-plate cross-flow heat exchanger.

DESCRIPTION OF THE PREFERRED EMBODIMENT

The present invention relates to the use of passive energy recovery devices in air handling units to providing temperature modification of conditioned air supplied to individual rooms service by the air handling units. The use of the term, "passive energy recovery device", refers to air cooling means requiring no mechanical energy such as is necessary to drive energy wheels or refrigeration compressors.

Figure 1:
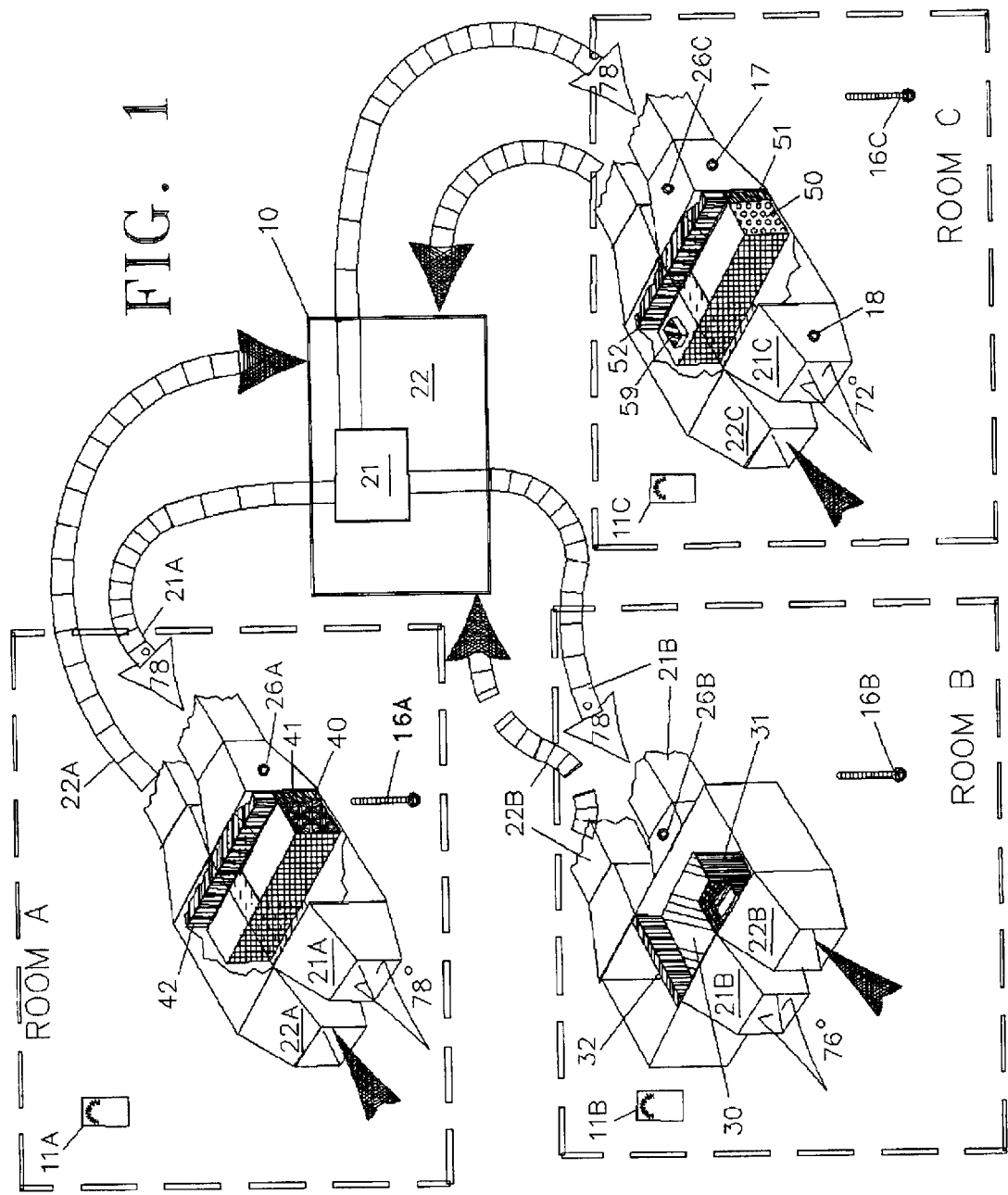
FIG. 1 is a schematic representation of an air handling system incorporating various embodiments of the invention.

A typical air handling unit providing conditioned air to a plurality of rooms is illustrated in FIG. 1. The rooms, A, B and C, each have a different temperature and constant volume or variable volume requirement. In the prior art systems, the input temperature to all room terminal units must be at least as low as that required to serve the room having the lowest temperature requirement (the greatest cooling load). This causes the air conditioner to work much harder than would be needed to meet the average demands of the building because it must provide an output great enough to keep every room in the building at approximately the temperature required by the coolest room. To meet varying temperature requirements for different rooms, existing systems rely on reheaters. In the prior art, if all three rooms in FIG. 1 must have their air exchanged every two hours and room A must be maintained at 78 degrees, room B must be maintained at 76 degrees and room C must be maintained at 72 degrees, heaters would be used in the terminal units for rooms A and B to raise the inlet temperature as required for each of these warmer rooms. This is a significant waste of energy. Not only does the air conditioning system 10 have to work much harder than required for the actual demands of the building, the cool air has to be reheated for most rooms, doubling the wasted energy. However, in the system of the present invention, as illustrated in FIG. 1, refrigerant means in the form of passive energy recovery devices such as heat exchangers of the fixed plate variety or a form of compressor-less refrigerant coil driven by heat tube, runaround coil loop or shell and tube thremosiphon technology replace conventional energy wheels or electric or flame reheaters. In the foregoing scenario, passive energy recovery device 40 receives no air flow across it due to fully closed face dampers 41 and fully open bypass dampers 42. Thus it has no effect on the temperature entering the room via duct 21A and the 78 degree output of the central conditioned air source 10 needs no modification.

The requirements of room B dictate that the air from the central conditioned air source 10 must be cooled 2 degrees before entering the room. Because room B is an outside room and subject to climatic influence, a fixed plate heat exchanger 30 is used to further cool the conditioned air. The air flow across the fixed plate heat exchanger 30 is adjusted through modulation of its face damper 31, and bypass damper 32 to maintain the required air exchange rate and control the thermal energy transfer between the air return duct 22B and room inlet duct 21B that is needed to keep room B at 76 degrees.

In room C, air flow across refrigerant coil 50 is adjusted by modulation of face dampers 51 and bypass dampers 52 to a volume adequate to insure a thermal energy transfer between exhaust or air return duct 22C and room inlet duct 21C that will result in room C being maintained at the proper temperature and air exchange rate. Room C requires more sever differential adjustment than the average room so a further control is provided whereby the efficiency of the heat exchange means is adjusted. This is achieved by control means 53 which varies the slant of the heat pipes comprising refrigerant coil 50 relative to the air return and inlet ducts and within a plain vertically bisecting ducts 21C and 22C to regulate the fluid flow rate within the heat pipes and between the ducts as further described with respect to FIG. 6.

FIG. 2 illustrates the terminal unit for room B in a building serviced by an air handling system such as illustrated in FIG. 1. This terminal unit includes a plenum chamber 35 which couples the room input port 33 and the exhaust or return air assembly 34 to the central air conditioning unit of the air handling system via conditioned air duct 21B and return air duct 22B. The input port and return air assembly may be provided with louvers 37 and 38 adapted to permit manual or automatic control of the air circulation in the room to augment the control provided by the primary heat exchange elements located in the plenum 35.

Figure 3:
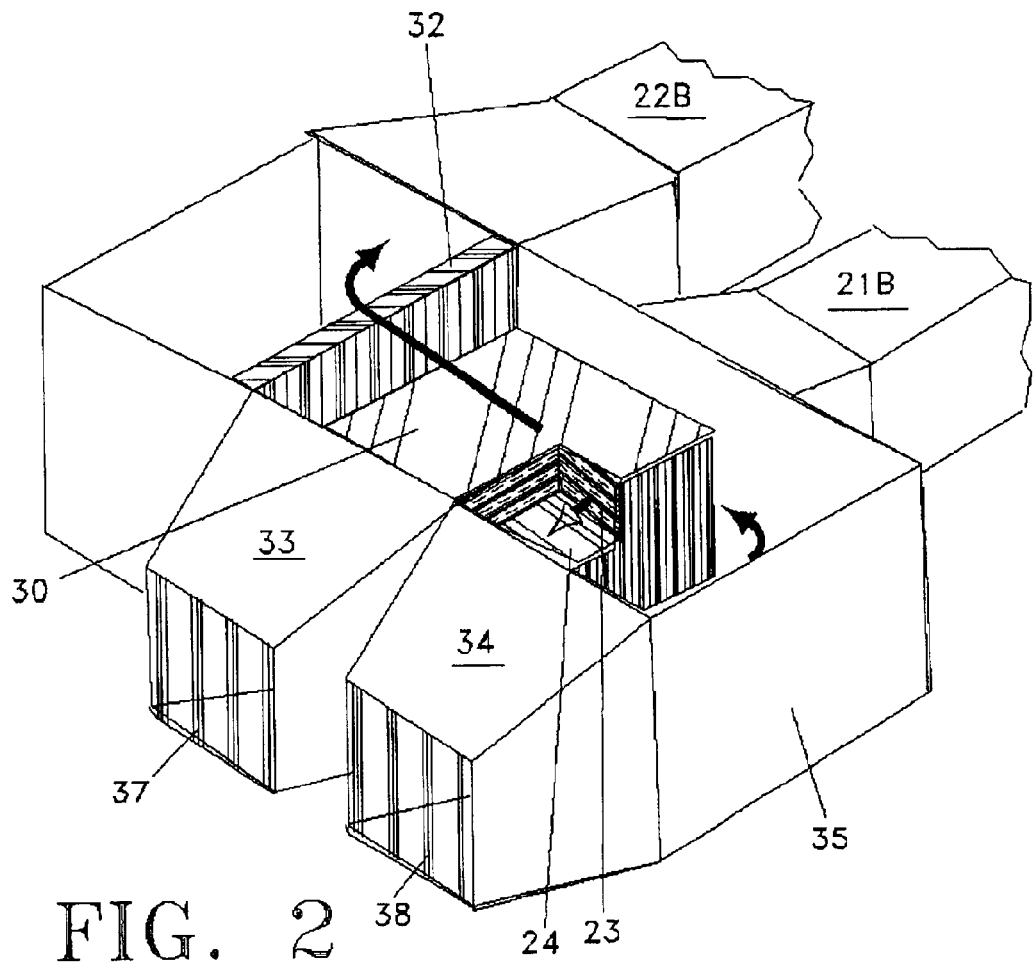
FIG. 3 is a schematic drawing illustrating the individual room air handling unit of FIG. 2 as view from above.
Figure 4:
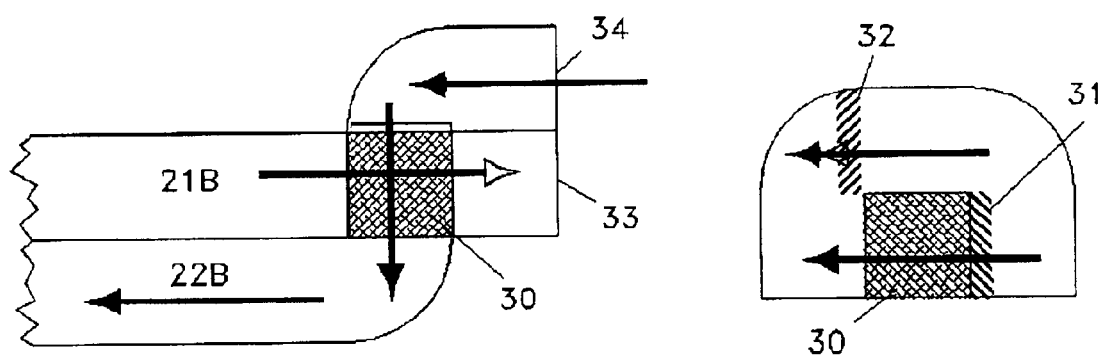
FIG. 4 is a sectional schematic drawing illustrating the individual room air handling unit of FIG. 2.

The distinctive features of this terminal unit passive energy recovery system comprise a plate-type heat exchanger 30, a face damper 31 and a bypass damper 32. The plate-type heat exchanger may be of conventional designs such as that illustrated in U.S. Pat. Nos. 4,314,607 or 4,162,703. However, to simplifying the system ducting and maximize thermal energy recovery, a cross-flow design is used. In this type of construction the air flow channels are arranged perpendicularly as opposed to the counter flow technique encountered most frequently in fixed plate designs. This is accomplished by providing a plurality of channels 23 through which air from the conditioned air duct 21B flows any bit plurality of perpendicular channels 24 through which the return air flows. The face damper 31 and bypass damper 32 are automatically modulated to regulate the heat exchange between the inflow and exhaust air streams. This may best be seen in FIGS. 3 and the 4 which schematically illustrate the air flow. Return air enters the return air assembly 34 as indicated by the solid headed Aero 25 and flows through channels 24 of the heat exchanger after passing through face damper 31. This damper is automatically controlled as a function of the room requirements, the temperature of the conditioned air input and the temperature of the exhaust air. The bypass damper 32 works in concert with the face damper to insure that required air exchange rate is maintained as well as the room air temperature. Thus the path of return air is through the return air assembly 34, through the fixed plate heat exchanger channels 24 in the slave store bypass duct 32 to the return air duct 22B. The conditioned air passes from the supply duct 21B through channels 23 of the heat exchanger 30 as indicated by the white arrow head 26. In this arrangement the air exchange rate is controlled by the louvers 37 and 38 but in an alternate embodiment it is controlled by a second face plate which regulates the amount of conditioned air entering channels 23 of the heat exchanger.

Figure 5:
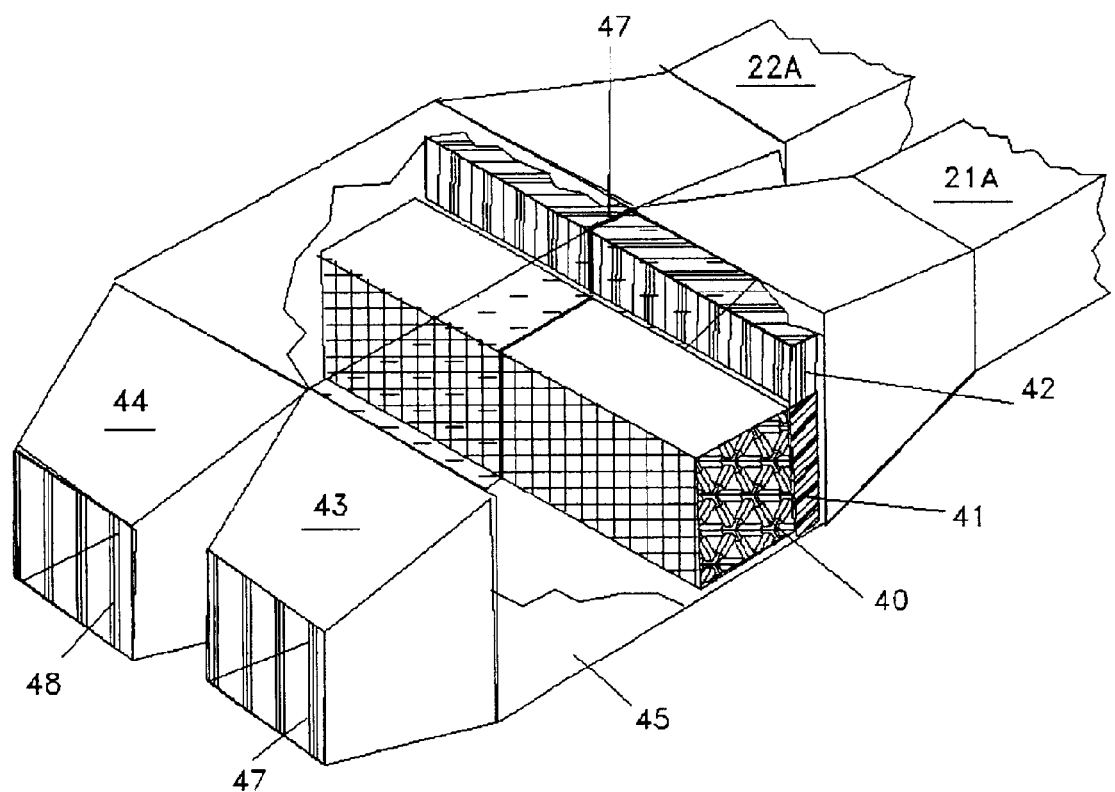
FIG. 5 is a perspective view of an individual room air handling unit cut away to show the employment of a runaround coil loop heat exchanger.

FIG. 5 illustrates the terminal unit for room A in a building serviced by an air handling system such as illustrated in FIG. 1. This terminal unit includes a plenum chamber 45 which couples the room input port 43 and the exhaust or return air assembly 44 to the central air conditioning unit of the air handling system via conditioned air duct 21B and return air duct 22B. The input port and return air assembly may be provided with louvers 47 and 48 adapted to permit manual or automatic control of the air circulation in the room to augment the control provided by the primary heat exchange elements located in the plenum 45.

The distinctive features of this terminal unit passive energy recovery system comprise a runaround coil loop 40, a face damper 41 and a bypass damper 42. The runaround coil loop in the illustrated embodiment is designed for parallel air flow of the supply and return. This occurs within the plenum chamber 45 which is divided by a wall which bifurcates the runaround coil loop in a plain indicated by the structural line 47 in FIG. 5.

The refrigerant coil 40, i.e., runaround coil loop, provides a thermal energy transfer between the return and supply air flows. The amount of thermal transfer is a function of the position of the face and bypass dampers 41 and 42 respectively and the temperature difference between the supply and return ducts and velocity of the air flow or unit volume of air per time period as sensed by strategically placed probes. In the illustrated example the desired temperature for room A is the same as the temperature of conditioned air supplied by the central air conditioner 10. This results in the bypass damper 42 being maintained in the open position while the face damper 41 is held closed. In this configuration the air flow rate is preferably controlled by the position of the open bypass damper vanes. In an alternate embodiment the air flow rate is controlled by modulating the position of the input port louvers 47.

The dampers and louver are standard commercially available units driven by an integral electric or pneumatic motor. They can be single or multiple bladed arranged in parallel or opposed configurations. The dampers and louvers presented herein for all embodiments are exemplary. The invention anticipates the use of any type of damper or adjustable louver.

Figure 6:
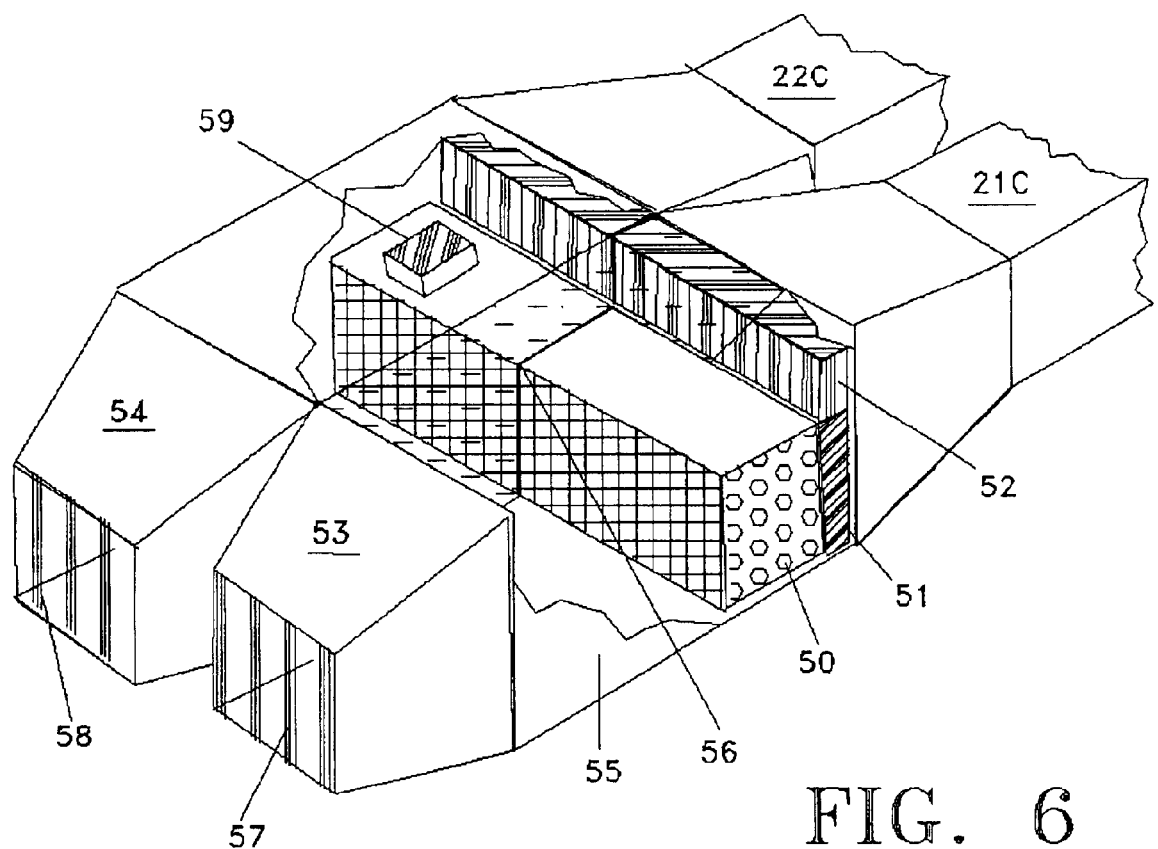
FIG. 6 is perspective view of an individual room air handling unit cut away to show the employment of a heat pipe heat exchanger.

FIG. 6 illustrates the terminal unit for room C in a building serviced by an air handling system such as illustrated in FIG. 1. This terminal unit includes a plenum chamber 55 which couples the room input port 53 and the exhaust or return air assembly 54 to the central air conditioning unit of the air handling system via conditioned air duct 21B and return air duct 22B. The input port and return air assembly may be provided with louvers 57 and 58 adapted to permit manual or automatic control of the air circulation in the room to augment the control provided by the primary heat exchange elements located in the plenum 55.

The distinctive features of this terminal unit passive energy recovery system comprise a heat pipe assembly 50, a face damper 51 and a bypass damper 52. The heat pipe assembly in the illustrated embodiment is designed for parallel air flow of the supply and return. This occurs within the plenum chamber 55 which is divided by a wall 56 which bifurcates the heat pipe assembly 50. The principles of operation of the heat pipe assembly incorporated in a preferred embodiment the present invention are presented with respect to FIG. 7.

The refrigerant coil 50, i.e., heat pipe assembly, provides a thermal energy transfer between the return and supply air flows. The amount of thermal transfer is a function of the position of the face and bypass dampers 51 and 52 respectively, the relative angle of the heat pipe sections and the temperature difference between the supply and return ducts and velocity of the air flow or unit volume of air per time period as sensed by strategically placed probes in the supply and return systems.

In the illustrated example the desired temperature for room C is 6 degrees cooler than the temperature of conditioned air supplied by the central air conditioner 10. To cool the incoming air and maintaining the required air exchange rate, the bypass damper 52 and face damper 51 are modulated via their integral positioning motors which are responsive to an automated control system 59 which uses temperature and flow rates sensed by probes strategically placed in the supply and return air flow paths. The automated control system also regulates the relative angle's of the heat pipe sections via a worm drive similar to that described in U.S. Pat. No. 4,971,139. Alternately, any controllable means may be used to adjust the heat pipe relative angles. In an alternate embodiment the air flow rate is controlled by modulating the position of the room input port louvers 57.

Figure 7:
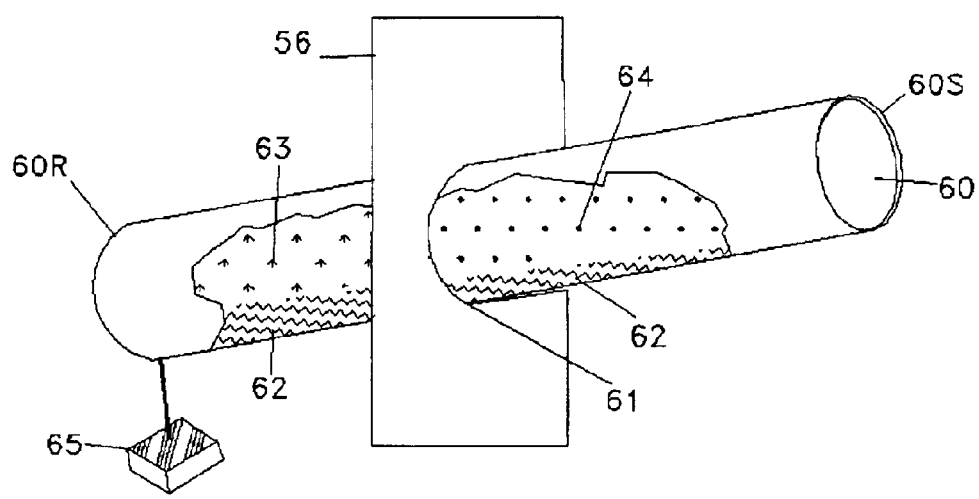
FIG. 7 is a simplified presentation of the pipe assembly of FIG. 6.

They heat pipe heat exchanger 50 incorporated in the individual room terminal air handling unit illustrated in FIG. 6 is presented in simplified for FIG. 7 to demonstrate its operational principles. In the actual apparatus, a plurality of heat pipes are employed but for simplification, only one is illustrated in FIG. 7. This exemplary pipe 60 is pivoted at its center point 61 where the pipe passes through the wall 56 dividing the terminal unit plenum 55 into a conditioned air supply conduit and an air return. This divides the exemplary heat pipe into a room air supply side 60S and an air return side 60R. If, as desired for the operation of the unit illustrated FIG. 6, the conditioned air supply is to be further cooled, the heat pipe is tilted with the return air side, 60R, position lower than the room air supply side 60S. The heat of the exhaust air causes refrigerant 62 to pass into a gaseous phase 63. As a gas, the refrigerant rises from the return air side to the room air supply side 60S where it condenses 64. This cools the outer surface of the raised section of pipe 60S and reduces the temperature of conditioned air entering the room. Condensed, liquified, refrigerant 62 flows via gravity to the lower end. 60R, of the heat pipe 60 and the cycle continues.

The angle adjust mechanism 65 controls the angle of tilt of the heat pipe. This adjustment mechanism may be manual, but in a preferred embodiment, it is electrical and drives the heat pipe into the position dictated by the microprocessor based controller 59. The embodiment of the invention utilizing a tilt regulated heat pipe assembly is a preferred embodiment because it provides the ability to adjust the pipe angle so that conditioned air entering the room may be cooled as in the example or, by elevating the return air side 60R above the supply side 60S, heated. The preferred method of using this embodiment is adjusting the slope of the heat pipe passive energy recovery device as a function of the rate of air flow through the heat pipe passive energy recovery device and thereby control its deficiency.

The invention contemplates the use of any combination of the preceding passive energy recovery devices including variations thereof. This includes other types of passive energy recovery devices such as, thermosiphons, ring around coil loops, etc. The method used most advantageously with passive energy recovery devices employed in the various embodiments comprises the steps of: 1) measuring the temperature of the conditioned air supplied to the room by a central unit; 2) measuring the temperature within the room; 3) adjusting the flow of conditioned air through a passive energy recovery device as a function of the temperature of the conditioned air supplied to the room and the temperature within the room; and 4) adjusting the flow of conditioned air bypassing the passive energy recovery device as a function of the temperature of the conditioned air supplied to the room and the temperature within the room. If it is a requirement to maintain a specific air flow rate through the room, additional steps are employed to measure the velocity and/or the rate of flow from the conditioned air source and adjust louvers controlling the air flow into and/or out of the room. If it is desirable to maintain a positive pressure within the room, the air exchange rate is controlled by regulating the louvers controlling the air flow out of the room. In the alternative, the rate of air exchange may be control by modulating the devices which just the air flow through and around the passive energy recovery device.

As illustrated by FIG. 1, a transducer 26 is positioned in the supply duct, 21, to monitor the velocity of air flow. This is equated to the volume of air per unit time that is exchanged in each the room. Because of the variance in air flow resistance among the various rooms, the preferred embodiment includes multiple transducers 26A, B and C, each located in the respective individual room supply duct 21A, B or C. The value is processed to provide the required settings for dampers or louvers to maintain a constant or variable volume air exchange. The dampers or louvers are adjusted by electrical or pneumatic motors regulated by the room controllers 11A B and C. In alternate embodiments, dampers or louvers may be manually placed a position to maintain the required constant or variable volume air exchange. In one such embodiment illustrated by FIG. 2, louvers 38 in the exhaust duct inlet are adjusted to create a positive pressure within the room. Alternately, constant or variable volume air exchange requirements may be met by adjusting dampers 31 and 32 in the exhaust flow paths. With this method of adjustment by means of the face and bypass dampers, a positive pressure may be maintained in the room but temperature control via the passive energy recovery device 30 is more complex.

Each room is provided with a temperature responsive transducer, 16A, B or C, which provides a signal that is processed by the room controller to determine a difference value between the temperature in the room and the target room temperature. The difference value is a control function that is used to regulate the positions of the face and bypass dampers, and in certain conditions when heat pipes are used, the inclination of the heat pipes.

In various embodiments, the air velocity through the terminal unit provides another factor in determining the positions of the face and bypass dampers for meeting the environmental requirements of the space serviced by the terminal unit. In other embodiments, temperature sensors such as 17 and 18 in room C of FIG. 1 are positioned upstream and downstream to provide control inputs to the room controller to enable calculation of the face and bypass damper position control functions as the difference between the room temperature and the air temperature in the supply duct before and after the passive energy recovery device. Thus the face and bypass damper positions are regulated by the room controller as a function of any or all of the following: 1) air velocity through the duct; 2) air volume per unit time through the duct; 3) air temperature in the volume serviced by the terminal unit; 4) air temperature in the supply duct up stream and downstream of the passive energy recovery device. In installations such as a room C, where the passive energy recovery device is a heat pipe assembly provided with an automatic tilt adjustment control system 59, any or all of the preceding may be used as the basis for the tilt motor position control input.

The room controllers may incorporate microprocessor technology to process the foregoing values to arrive at the proper damper position command based on any or all of the foregoing measured functions. Alternately, the room controllers may achieve their goal by dedicated circuitry or through implementation of Application-Specific Integrated Circuits (ASIC).

The electrical control cables between the room controllers 11 and their associated and transducers and damper positioning motors are not illustrated because they are obvious adaptation dictated by which are the various embodiments are employed and room configuration. In the embodiments using pneumatic motors, electrical connections may be used to control valves at the motor sites or the pneumatic lines may run from the controller.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. An air handling system, comprising:

a terminal unit including a room supply channel connected to a room supply duct and an exhaust channel connected to an exhaust duct;

a passive thermal energy recovery means located in said terminal unit and positioned therein to enable air flowing through said room supply channel and said exhaust channel to pass through said passive energy recovery means in heat exchange association;

a face damper for controlling air flow through said passive thermal energy recovery means;

a bypass damper for controlling air flow circumventing said passive thermal energy recovery means;

means for adjusting said face damper and said bypass damper in response to the environmental demands of the space serviced by said terminal unit;

said means for adjusting said face and bypass dampers comprises a room controller including a means for determining the optimum setting of said face damper and said bypass damper as a function of temperature differentials between the supply air to said terminal unit and the ambient temperature in said space serviced by said terminal unit; and said room controller regulates the volume of air per unit of time flowing through said space serviced by said terminal unit in response to the velocity of air flowing into said space via said terminal unit by adjusting the position of louvers located in openings connecting said room supply channel and said exhaust channel to said space.

2. An air handling system as defined by a claim 1, wherein said face damper and said bypass damper are positioned in said terminal unit for controlling air flow through a common one of said channels.

3. An air handling system as defined by claim 1, wherein said means for adjusting said face and bypass dampers provides a damper control function based on the temperature of the supply air stream passing through said terminal unit as measured up stream of said passive energy recovery means.

4. An air handling system as defined by claim 1, wherein said louvers are motor driven and positioned in the one of said openings serving said room supply channel.

5. An air handling system as defined by claim 1, wherein said louvers are motor driven and positioned in the one of said openings serving said exhaust channel.

6. An air handling system as defined by claim 1, wherein said passive energy recycling means includes a fixed plate heat exchanger.

7. An air handling system as defined by claim 1, wherein said passive energy recycling means includes a heat pipe.

8. An air handling system as defined by claim 7, comprising:

means for adjusting the slope of said heat pipe between said room supply channel and said exhaust channel within said terminal unit.

9. An air handling system as defined by claim 1, wherein said passive energy recycling means includes a thermosiphon heat exchanger.

10. An air handling system as defined by claim 1, wherein said passive energy recycling means includes a ringaround loop heat exchanger.

11. An air handling system, comprising:

a return air duct;

a supply air duct;

a passive energy recycling means positioned for simultaneous exposure to air flowing through said return air duct and said supply air duct;

a control means;

a passive energy recycling means face damper;

a passive energy recycling means bypass damper;

means for adjusting said passive energy recycling means face damper and said passive energy recycling means bypass damper in response to commands from said control means;

a room air temperature sensor;

means for determining air temperature in said supply air duct up stream from said passive energy recycling means;

means for measuring velocity of air flowing through said supply air duct;

said control means comprises means responsive to said room air temperature sensor, said means for determining air temperature in said supply air duct and means for measuring velocity of air flowing through said supply air duct for calculating said commands from said control means;

said control means including a means for determining the optimum setting of said face damper and said bypass damper as a function of temperature differentials between the supply air to said supply air duct and the ambient temperature in the room serviced by said air handling system; and said control means regulates the volume of air per unit of time flowing through said room serviced by said air handling system in response to the velocity of air flowing into said room via said supply air duct by adjusting the position of louvers located in openings connecting said supply air duct and said return air duct to said room.

* * * * *